Aug. 16, 1966  J. LYSAK  3,266,124
METHOD OF AND APPARATUS FOR SEALING GLASS-TYPE ENVELOPES
Filed May 1, 1962  2 Sheets-Sheet 1
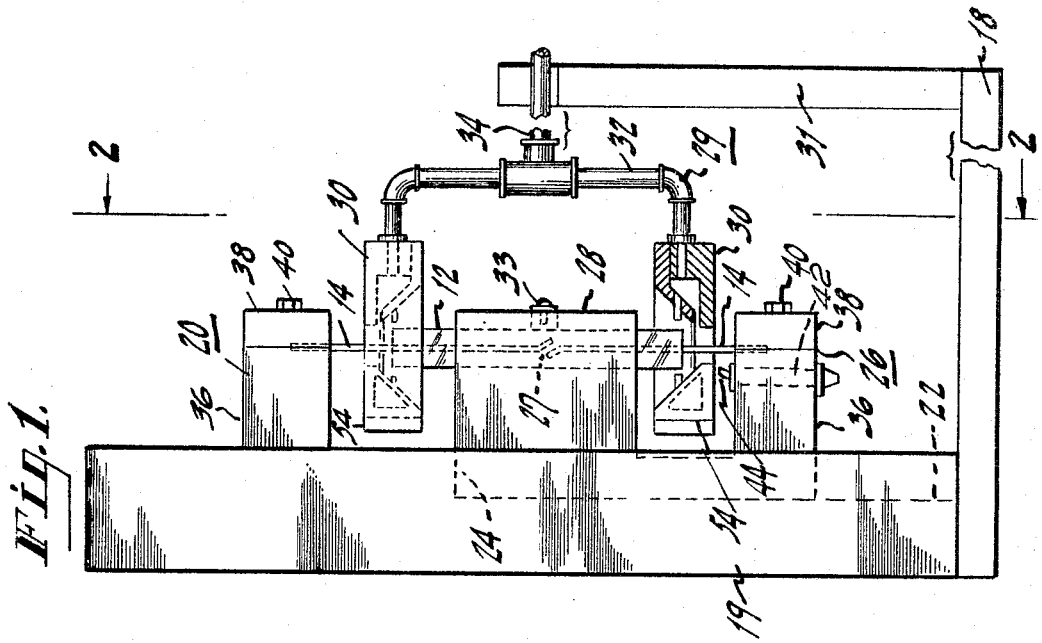
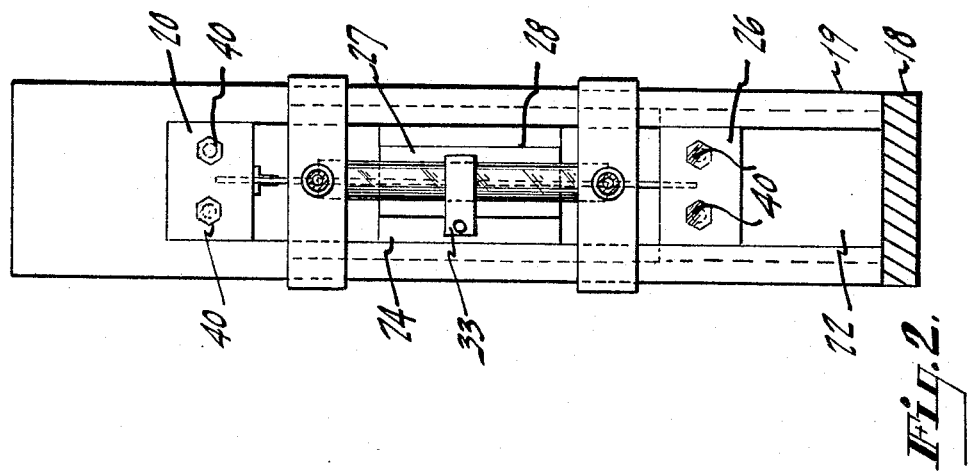
INVENTOR.
JOHN LYSAK
BY
William A. Zalesak
Attorney Aug. 16, 1966    J. LYSAK    3,266,124
METHOD OF AND APPARATUS FOR SEALING GLASS-TYPE ENVELOPES
Filed May 1, 1962    2 Sheets-Sheet 2
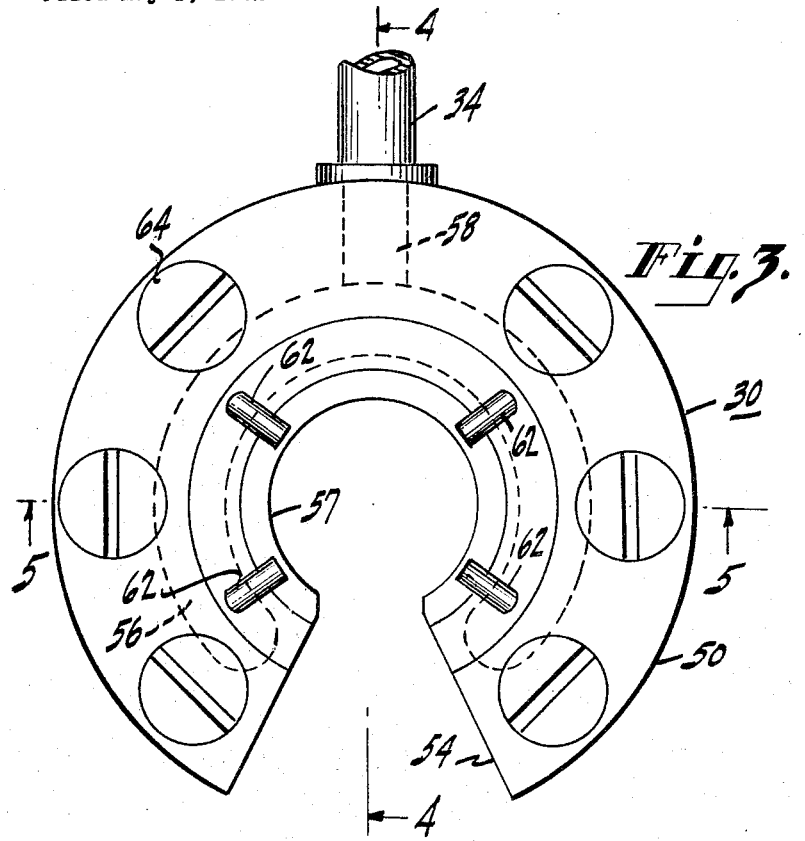
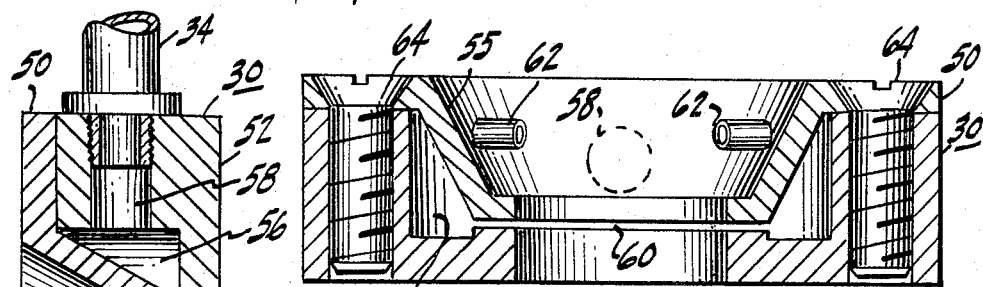
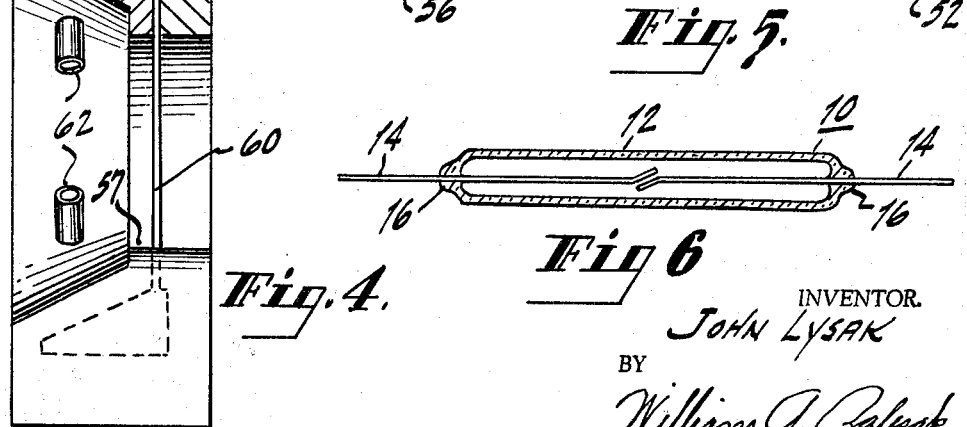
INVENTOR.
JOHN LYSAK
BY
William A. Zalesak
Attorney … # 3,266,124
METHOD OF AND APPARATUS FOR SEALING GLASS-TYPE ENVELOPES
John Lysak, Colonia, N.J., assignor to Radio Corporation of America, a corporation of Delaware
Filed May 1, 1962, Ser. No. 191,585
8 Claims. (Cl. 29—155.5)

This invention relates to the method of and apparatus for sealing portions of tubular glass envelopes through which an electrical connection passes, used for example, in the sealing of envelopes of reed switches.

A known type of glass reed switch comprises a pair of reeds of magnetic material projecting into a short portion of glass tube, the inner ends of the reeds overlapping slightly and the outer ends of the reeds projecting through and sealed vacuum tight in the ends of the tubing to act as terminals of the switch. The ends of the glass tubing are sealed to the reeds in a known manner to provide an envelope for the switch. Preferably, the glass envelope is provided with a reducing atmosphere. Such a switch is closed by applying a magnetic field thereto of a strength sufficient to cause the overlapping portions of the magnetic reeds to contact each other.

One way of making glass reed switches comprises inserting magnetic reeds into a glass tube from opposite ends thereof until the inner ends of the reeds overlap with a desired gap between the ends of the reeds and then sealing the reeds intermediate their ends in the ends of the glass tubing. The adjustment of the relative position of the reeds can be made visually or the reeds and the tube can be inserted in a magnetic field of predetermined strength and the reeds moved with respect to each other until the magnetic field causes the overlapping ends of the reeds to contact each other. Then the ends of the glass tube are sealed to the reeds to preserve the positioning of the reeds and to protect the reeds from the atmosphere. The use to which reed switches are put often requires that they be closed by the same strength of magnetic field, that is, they should have uniform operating characteristics.

Making glass reed switches according to the prior art leaves much to be desired. For example, each reed is held at its end while the reed is sealed in the glass tubing. At sealing temperature, the reed is mechanically weak and the heating thereof distorts it. If the sealing takes too long, the reed may sag during the sealing process. The very act of sealing the glass to the reed involves forces which result in deflecting the reed. Distortion, sagging and deflection of the reed may change the relative position of the reed from the proper one, resulting in reed switches which do not have uniform operating characteristics or may even be inoperative. Also, while oxidation of the surface of the reed at the seal produces a good glass to metal seal, oxidation of the reed at the contact portion thereof should be avoided since most oxides are insulators. Proper oxidation of the reed at the seal while avoiding oxidation of the contact portion thereof present difficulties.

Sealing torches have been used for sealing reeds in the glass tubing. Production rates of prior art torches is low, adding to the cost of production. The sealing torches of the prior art take so long to produce the seal that sufficient time elapses to cause the reeds to sag or be deflected or distorted often resulting in a defective switch.

It is an object of this invention to provide an improved apparatus for sealing tubular glass envelopes.

More specifically, it is an object of my invention to provide an improved method and apparatus of making glass reed switches quickly with accurately positioned reeds, with minimum of distortion and desired oxidation of the reeds, the oxidation being limited to the sealing regions of said reeds.

According to an embodiment of this invention, the apparatus includes a pair of oppositely disposed spaced tipping torches or burners mounted for simultaneous movement along a predetermined path. Each of these burners is of annular shape with a sector omitted to provide passageway through the burner, and each burner produces a radially inwardly directed annular flame. The apparatus further includes a pair of reed clamps positioned adjacent the burners and a support for a tubular glass member between the reed clamps. One clamp may be fixed in position and the other clamp and the support for the tubular member may be moveable towards and away from the fixed clamp. A forming gas jet extends through one clamp for directing forming gas flame on an end of the tube. When so arranged that the clamps and support hold the reeds and glass member vertical, one forming gas jet directing gas against the lower end of the glass member may be sufficient.

The method of this invention may comprise clipping a glass tube on the tube support, clamping a reed in the moveable clamp and another reed in the fixed clamp, extending the end of said reeds into the tube until about the longitudinal middle of said tube, applying a forming gas flame adjusted to provide a reducing flame to one end of the tube to preliminarily heat the tube and, as will appear more fully hereinafter, to purge the tube of air and impurities and to properly oxidize the portion of the reeds that will be imbedded in the seal, while sliding the slidable clamp and tube support to or away from the stationary support to adjust the relative position of the inner ends of the reeds, and moving the two tipping torches or burners simultaneously to positions where the ends of the tube enter registered cut-away sectorial portions of the burners. The ends of the tube are thus centered in the annular flames produced by the burners, the ends of the tube thereby being hermetically sealed simultaneously to the reeds. The burners are withdrawn and the reeds unclamped and the finished glass reed switch is removed from the tube support and allowed to cool gradually.

This invention is described in greater detail in connection with the accompanying drawing in which:

FIG. 1 is a side elevation of the apparatus of this invention with the reed switch parts and the clamps and support and burners in their tube sealing position;

FIG. 2 is a sectional view on line 2—2 of FIG. 1;

FIG. 3 is a plan view of a burner of this invention;

FIG. 4 is a section taken on line 4—4 of FIG. 3;

FIG. 5 is a section taken on line 5—5 of FIG. 3; and,

FIG. 6 is a sectional view of a glass reed switch that may be made by the apparatus of this invention.

Turning first to FIG. 6 the reed switch 10, which may be made by the method and using the apparatus of this invention, comprises a glass envelope 12 into which extend a pair of elongated electrical connectors or reeds 14 of magnetic material. The connectors or reeds extend through the glass-to-metal seals 16. The inner ends of the connectors or reeds 14 are close enough together so that a predetermined magnetic field when applied to the reed switch 10 will cause the reeds to contact each other. While the inner ends of the reeds 14 are shown bent with respect to the remainder of the reeds, the bent portions are not essential and the reeds may be substantially straight throughout their lengths, the inner ends of the reeds overlapping and being spaced from each other a desired distance.

Apparatus for making the reed switches 10 are shown in FIGS. 1 and 2. A stationary base 18 is provided on which a vertical standard 19 is fixed. A reed or connector clamp 20 is fixed to vertical standard 19 near the top thereof. A dovetail groove 22 is formed in the standard 19 below stationary clamp 20. A dovetail slide 24 slidably fits dovetail groove 22 and a moveable reed or connector clamp 26 is fixed to the lower end of slide 24. A tube support 28 having a V-shape notch 27 along the edge thereof is mounted at the upper end of slide 24. A burner assembly 29 comprising a pair of identical burners 30 are held in parallel spaced position by piping 32 and 34 which supplies gas to the two burners 30. Support means 31 is provided for moving the assembly 29 to the left, as viewed in FIG. 1, to the position shown where the burners 30 are centered with respect to the tube 10 and a position to the right (not shown) where the burners 30 are completely to the right of the clamps 20, 26 and the tube support 28. As shown in FIG. 1, the burners 30 are identical and like faces are turned towards each other, as will be more fully explained below. Also, a sector of each annular burner is omitted providing an opening 54 in each burner, with the two openings 54 in the two burners being in registry.

The clamps 20 and 26 are substantially identical. Each clamp comprises a support portion 36 and a clamp bar 38. The support portion 36 of clamp 20 is fixed to standard 19. Support 36 of clamp 26 is fixed to slide 24. Each clamp bar 38 is fixed to its support portion 36 by cap screws 40. The clamp 26 also supports a fixture 42 for supplying forming gas or hydrogen to the glass tube 12 by means of a nozzle 44. As shown in FIGS. 1 and 2, glass tube 12 is held in V notch 27 by spring clip 33. Also, the outer ends of reeds 14 are individually held in clamps 20 and 26, with the inner ends of the reeds overlapping within the glass tube 12, by clamping the outer ends of the reeds between the respective supports 36 and clamp bars 38. The glass tube 12 is supported in the notch 27 of tube support 28 in a position so that upon proper positioning of the reeds 14, the overlapping portions of the reeds 14 will be centered along the length of the tube 12. The tube support 28 is so chosen that the portions of the reeds that will be sealed in the glass will be positioned along the axis of the tube 12.

Burners 30 are shown in detail at an enlarged scale in FIGS. 3, 4, and 5. Each burner 30 comprise members 50 and 52 of annular shape. A sector of each member 50 and 52 is omitted to provide an opening 54 so that the tube 12 can enter the center of the burner 30 through the sectorial opening 54 by relative motion of the tube and burner in a direction perpendicular to the axis of the burner and of the tube. A gas chamber 56 is provided between the members 50 and 52 to which gas is supplied by means of pipe 34 threaded into bore 58 which communicates with chamber 56. A slot 60 is provided between the members 50 and 52 and through the inwardly directed surface of the burner, communicating with the gas chamber 56 to provide an annular gas jet. Small diameter gas tubes 62, here shown four in number, are provided equally spaced from each other and directed radially inwardly, each gas tube communicating with the gas chamber 56. The two members 50 and 52 are held together by means of screws 64 which extend through member 50 and threadedly received in member 52. The relative sizes of the glass tube 12 and the central hole through the burners 30 is such that the ends of the tubes 62 are closely adjacent to the periphery of the glass tube 12 during sealing. The tubes 62 provide gas jets which produce the heat necessary to form the seals 16, but the tubes 62 are so small in diameter that the gas flames they feed will not stay lit. The sheet of flame fed by slot 60 keeps the jets fed by tube 62 lit. A portion of member 50 forming a part of the inwardly directed wall of burner 30 is shown as being frustro-conical in shape, the tubes 62 extending inwardly from the frustro-conical portions. Also the inwardly directed surface 57 of member 52 is shown as being shaped as a right circular cylinder. However, the inwardly directed wall of member 50 may take any desired shape. If the inwardly directed wall of the member 50 has the shape of a right circular cylinder of the same diameter as the inner diameter of member 52, the tubes 62 may be omitted and a plurality of radially extending holes in the inwardly directed surface of the member 50, communicating with gas chamber 56, will provide the desired flame jets. Or, if desired, means for producing jet-like flames may be omitted entirely and the sealing heat will be provided by the sheet of flame fed by a slot 60. In all suitable forms of the burners a sector of the burner is left out, as shown at 54, for the purpose described above.

The method of operation of this device is as follows: at the beginning of the cycle, the burner assembly 29 is moved to the right, as viewed in FIG. 1 to the point where the burners 30 are beyond the clamps 20 and 26 and the tube support 28. The slide 24 is moved to its extreme lower position. Outer end portions of reeds 14 are clamped in clamps 20 and 26 with the inner end portions projecting towards each other, and if bent reeds are used, with the bent portions parallel. A glass tube 12 is clipped in place on support 28 by clip 33 with the end of left-hand reed 14 substantially centered along the length thereof, and that portion of the reed that is to be sealed to the tube extending substantially along the axis of the tube 12. Forming gas flame is supplied by nozzle 44. Slide 24 is moved up, the lower reed entering the tube 10, until the spacing between the inner ends of the reeds 14 is correct. At this spacing, the reeds will be caused to contact by application of a predetermined magnetic field to the reeds. This spacing may be determined by applying a magnetic field to the reeds and by observing the closing of the reeds upon noting the movement of the indicator of a meter in series with the switch. However, since the glass tube 12 is transparent, the proper spacing of the reeds may be determined by visual observation thereof. The burner assembly 29 is moved to the left, as viewed in FIG. 1, until the ends of the tube 12 are centered in the individual burners 30 and the burner flames seal the ends of the glass tubing to the reeds. In practice, the sealing of both ends of the reed switch may take place in three or four seconds and before the reeds have had time to heat to the point where they are so softened that they are distorted by the sealing process. The portion of the reeds 14 within the ends of glass tube 12 are properly oxidized due to the presence of atmospheric oxygen. However, at the center of the tubes, there is no flame due to absence of oxygen, whereby the inner or contact ends of the reeds 14 are not oxidized.

What is claimed is:

1. The method of assembling and sealing a glass reed switch comprising, holding a reed by an end thereof and in a predetermined position, holding another reed by an end thereof with the other end of said other reed in a glass tube both ends of which are open, flushing the interior of said glass tube with a forming gas flame and oxidizing said reeds, moving said second-mentioned reed and tube and said first-mentioned reed towards each other in such a manner that the free end of the first-mentioned reed enters an end of the tube and until the inner ends of the reeds are adjacent each other, and moving a pair of burners simultaneously to a position where the flame of each burner plays on a respective end of the tube.

2. The method of making a reed switch having an elongated tubular glass envelope, said envelope having sealed through the ends thereof oppositely disposed closely overlapping elongated reed elements, said method including the steps of supporting a tubular glass member in a vertical position, inserting a first reed element into said tubular member from one end thereof, inserting a second reed element from the other end of said tubular element so that the inner ends of said reeds are in a predetermined overlapping spaced relation with the outer ends of said reeds extending through the open ends of said tubular glass member, flushing the interior of said glass tubular member with a forming gas flame and oxidizing said reeds, and then simultaneously applying sealing fires to the open ends of said tubular glass member to seal said ends vacuum tight to said reeds.

3. In combination,
a pair of burners each of annular shape and each having sectorial openings in the periphery thereof,
means for holding said burners spaced apart and substantially coaxial and parallel,
the openings through said burners being in registry with each other,
and means permitting advance of said burners along a path with said openings leading and retraction of said burners along said path.

4. Apparatus for assembling and sealing a glass tube onto a pair of elongated connectors which comprises a pair of connector clamps each adapted to support a connector, and a glass tube support,
one of said connector clamps and said tube support being moveable with respect to the other of said connector clamps for positioning said connectors with respect to each other,
means for playing a forming gas flame on an end of said tube,
and a pair of annular burners each having a sectorial opening in the periphery thereof,
and means for moving said burners simultaneously to a position where the burners substantially surround the ends of the tube.

5. Apparatus for assembling and sealing a glass reed switch which comprises a support,
a first reed clamp fixed to said support and adapted to hold a first reed by an end thereof and extended in a predetermined direction,
a slide mounted for sliding motion towards said first clamp and in said direction, a further reed clamp mounted on said slide and adapted to hold a further reed by an end thereof and extended towards said first clamp, whereby said reeds may be positioned with respect to each other upon movement of said slide,
a glass tube support also mounted on said slide,
a pair of annular burners each having a sectorial opening in the periphery thereof,
said burners being simultaneously moveable to a position where the burners substantially surround the ends of a tube supported on said tube supports,
and said burners being movable to a position away from the ends of said tube.

6. The method of making a reed switch having an elongated tubular glass envelope, said envelope having sealed through the ends thereof oppositely disposed closely spaced and overlapping elongated reed elements,
said method including the steps of supporting a tubular glass member in a vertical position,
inserting a first reed element into said tubular member from one end thereof,
inserting a second reed element from the other end of said tubular element and positioning said second reed element so that the inner ends of said reeds are in a predetermined overlapping spaced relation with the outer ends of said reeds extending through the open ends of said tubular glass member,
providing a purging gas at the lower end of said glass member for purging the air from the interior of said member,
and thereafter applying sealing fires to the open ends of said tubular member to seal said ends vacuum tight to said reeds.

7. Apparatus for assembling and sealing a glass tube onto a pair of elongated connectors which comprises:
a pair of connector clamps each adapted to support a connector in extending relation towards the other of said connectors,
a glass tube support disposed between said clamps,
one of said connector clamps being movable with respect to the other of said clamps for accurately positioning connectors held in said clamps with respect to each other,
means for purging air from a glass tube supported by said tube support,
a pair of annular burners each having a sectorial opening in the periphery thereof,
and means for moving said burners to a position where the burners substantially surround portions of said tube for sealing said tube onto said reeds.

8. Apparatus for assembling and sealing a glass tube onto a pair of elongated connectors which comprises:
a support adapted to support a glass tube in vertical orientation,
a pair of connector clamps disposed adjacent opposite ends of said support and each adapted to support a connector in extending relation towards the other of said connectors and into a glass tube supported by said support,
one of said connector clamps being movable with respect to the other of said clamps for accurately positioning connectors supported by said clamps with respect to each other,
means for applying a forming gas flame adjacent the lower end of said glass tube for purging the air from said tube and preheating said reeds,
a pair of annular burners each having a sectorial opening in the periphery thereof,
and means for moving said burners to a position where the burners substantially surround portions of said tube for sealing said tube onto said reeds.

References Cited by the Examiner

UNITED STATES PATENTS

| | | | |
|---|---|---|---|
| 1,631,377 | 6/1927 | Loebe et al. | 65—270 |
| 2,079,893 | 5/1937 | Bain et al. | 65—270 X |
| 2,406,021 | 8/1946 | Little | 29—155.5 |
| 2,571,537 | 10/1951 | Cartun | 263—5 X |

JOHN F. CAMPBELL, *Primary Examiner.*

WHITMORE A. WILTZ, *Examiner.*

C. I. SHERMAN, J. M. ROMANCHIK,
*Assistant Examiners.*